March 5, 1946.　　　T. GROVEN ET AL　　　2,396,172

TESTING DEVICE

Filed Aug. 28, 1943

INVENTORS,
THOV GROVEN.
DICKSON R. BUXTON.
BY
Chas. E. Townsend.
ATTORNEY.

Patented Mar. 5, 1946

2,396,172

UNITED STATES PATENT OFFICE 2,396,172

TESTING DEVICE

Thov Groven and Dickson R. Buxton,
Las Vegas, Nev.

Application August 28, 1943, Serial No. 500,404

1 Claim. (Cl. 173—324)

This invention relates to testing devices, and more particularly to a novel testing device designed to test insulating material, especially insulation applied to the interior of pipes.

In testing the resistant capacity of insulation, it is of utmost importance to obtain a complete and accurate test thereof in order to avoid a later break because of incorrect application, undue porosity, or defective material, which easily succumbs to the corrosive action of acid-bearing liquids, and the like, such as chlorine.

It is not practical nor adequate to attempt a physical examination of an internally lined pipe, due to the inaccessibility thereof. Internally lined pipes are often, for example, two inches in diameter and twenty feet long.

In brief, we contemplate employing high voltage at high and/or low amperage as a break down test, in order to establish classification of the articles to be tested, as to its ability to withstand voltage, amperage, and acid attack. For example, we have found that 30,000 volts at sixteen milliamps was the proper step-up for testing one-quarter inch hard rolled rubber insulation in a given pipe. Such voltage had enough power to detect all defects and a low enough amperage to prevent burning, scorching or otherwise deleterious effect upon the rubber. The voltage was sufficient to operate a complete satisfactory, efficient and positive test with our novel apparatus. By employing six inches of eleven millimeter tubing pumped at seven to ten millimeters of red or neon gas in the secondary circuit, as will hereinafter be described, for every 1000 transformed volts, the corona discharge is minimized at the electrode. Without the neon tube in the circuit the corona discharge could be dangerous to the material under test.

The same general procedure of testing may be carried out to test numerous insulated articles for resistant capacity, such as rubber gloves, sheets, receptacles, tires, and the like, by making appropriate changes in voltage and amperage and insuring proper circuit connections.

One of the most vexatious problems in conducting insulation tests is that of obtaining a proper test of lining in pipe, and it is a general objective of our invention to provide an apparatus for accomplishing this purpose. It is also an object of our invention to provide an apparatus for detecting and locating defects in insulation.

Another object of our invention is to provide an apparatus for testing insulation, especially of internally insulated pipes, which provides a three-way check as to possible defects, namely, a neon tube which comes brilliantly aglow when the testing electrode discovers a defect, the sudden cessation of high voltage hum when a defect is found, and the presence of a visible high voltage arc when a defect is located.

Another object is to provide a testing apparatus which is provided with indicating means which assures the operator of current flow through the secondary circuit and, therefore, that the test is being made free of testing apparatus breakdown. In the past, testing devices have not been provided with a positive indicating means which signifies testing operability during use.

A further object is to provide a testing apparatus having a rheostatic control therefor in order to allow for available variable testing of articles.

A further object is to provide a testing apparatus which obviates the danger of damage to material under test because of corona discharge adjacent to the testing electrode.

Another object of our invention is to provide an efficient, reliable testing electrode for use in testing internally insulated pipes.

A further object of our invention is to provide a portable, self-contained apparatus of the character above mentioned having all of the features herein set forth, which is neither cumbersome of use nor of a breakable character.

Further objects are to provide a testing apparatus which is relatively inexpensive to manufacture and assemble, easy for the unskilled to use, and yet positive in results. Other objects and advantages will become apparent upon reference to the specification and drawing hereto annexed and made a part hereof.

In the drawing, similar characters of reference represent corresponding parts in the several views.

Figure 1:
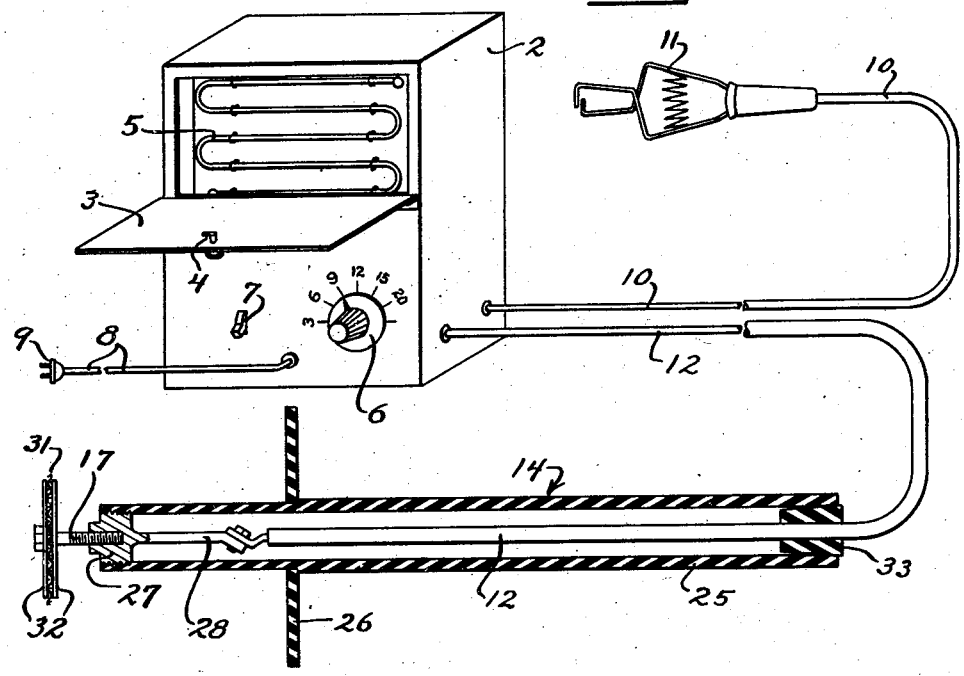
Fig. 1 is a perspective view of our portable apparatus and a longitudinal sectional view of a preferred form of pipe testing electrode.

We prefer to house our apparatus in a portable case, indicated generally at 2, which may be provided with carrying handles, or the like, for convenience in movement. A hinged front panel 3, provided with a latch 4, allows access to the visual indicator 5, namely, the neon tube. In moving the unit, the panel 3 is closed in order to protect the tube from possible breakage. A rheostat control dial 6 is conveniently located in the exterior of the case for adjustment of voltage. A switch 7 is located adjacent to the dial in order to shut off or start the apparatus.

A source lead line 8, provided with a plug 9 to pick up current from an available source, leads to the apparatus. Lead 10, connected to one end of the neon tube, is provided with a clamp 11, adapted for contact with the metal or other conductor backing of an article to be tested. Lead 12, which leads from the transformer 13, not shown in Fig. 1, makes connection with a contact type of testing electrode, generally designated at 14.

Figure 2:
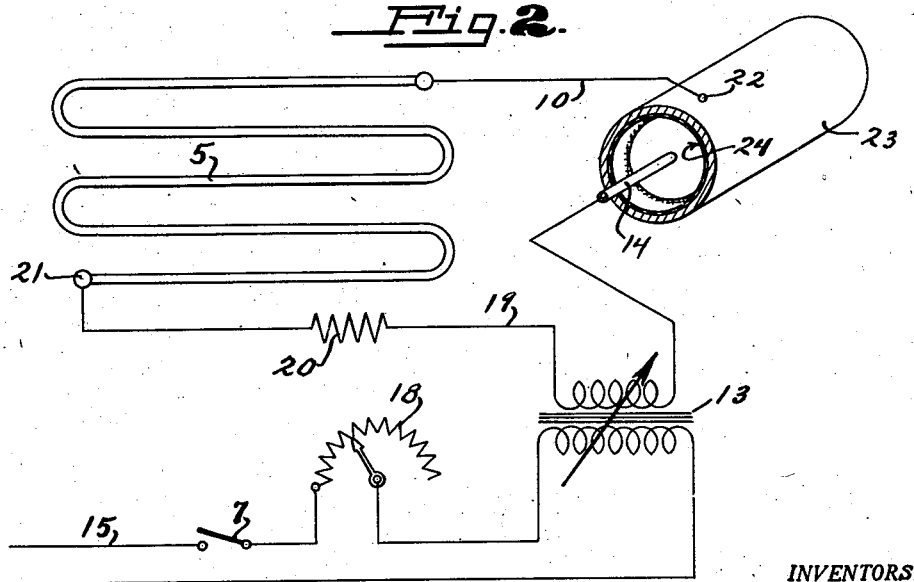
Fig. 2 is a diagrammatic view of our electrical apparatus.

The circuit diagram (Fig. 2) shows in detail the apparatus contained in, and leading to and from, case 2.

Source leads 15 and 16 lead to a transformer 13, here illustrated as a variable voltage transformer. We preferably use a varying voltage type self-air-cooled transformer, with iron core, having one primary coil and two secondary coils. As the load increases, as when the electrode goes over a thin spot in the lining or picks up a leak or defect in the lining, the leakage flux of the transformer primary produces a voltage drop in the primary winding, thereby reducing the secondary voltage. Lead 15 is provided with a conventional switch 7 and a rheostatic control 18.

The secondary of the transformer will now be described. Ground lead 19, connected to one side of the transformer, is sometimes provided with a resistor 20, although not necessarily, and is connected to an electrode 21 of a neon or other suitable gas-filled tube 5, previously mentioned. A cable 10 leads from the neon unit and is provided with a clamp or other suitable conductor grip to make contact with the metallic backing of the article to be tested, as at 22 on pipe 23 which is internally insulated, as at 24.

The other side of the transformer secondary is connected to line 12 which is provided with a contact type of testing electrode 14 adapted to be inserted into the pipe to be tested.

We prefer to use a contact electrode, represented generally at 14, which comprises a fibre or other fully insulated tubular handle member 25, provided with a preferably radial handshield 26. The handle member is formed at its front end to receive removably a conductor element 27, in the form of a plug, adapted to fit concentrically within the end of the tubular handle, illustrated in the drawing as threadably engaged therewith.

The plug 27 is provided with a conductor shaft 28 provided with a suitable attachment 29 for making and retaining contact with line 12. The contact portion of the electrode comprises a headed stem 17 which supports radially a disk or a plurality of disks of wire mesh or the like 31, reinforced as at 32. The disks are cut to the proper dimensions so that they will fit within the size pipes to be tested and make contact with the insulating material therein provided. We have found that mesh wire, such as window screening, is a most satisfactory type of testing electrode. In testing lengths of pipe, the handle may be elongated as desired.

A fibre plug 33 is inserted in the back of the tubular handle to restrain frictionally the high tension cable lead 11 from undesired movement relative to said handle. It is obvious that many other types, shapes and forms of contact testing electrodes may be utilized, depending on the type of articles being subjected to test, circumstances of test, and the desires of the operator.

We have explained and described our invention in some details, which, obviously, may be varied and modified, and it is understood that modifications and variations may be made within the spirit of the invention and scope of the appended claim.

We claim:

In equipment of the class described for testing the insulation of internally lined conduits, a contact electrode comprising a tubular handle element formed of insulating material, a conductor element mounted in one end of said tubular handle element, an electrode lead passing through the other end of said tubular handle element and connecting said conductor element to a source of electrical energy, an annular shield formed of insulating material mounted on said tubular handle element between the opposite ends thereof and disposed perpendicular to the longitudinal axis of said tubular handle element, a pair of support disks formed of conducting material mounted on and supported by said conductor element and disposed perpendicular to the longitudinal axis of said tubular handle element and a plurality of wire mesh disks supported between said support disks and extending beyond the periphery of said support disks.

THOV GROVEN.
DICKSON R. BUXTON.